UNITED STATES PATENT OFFICE.

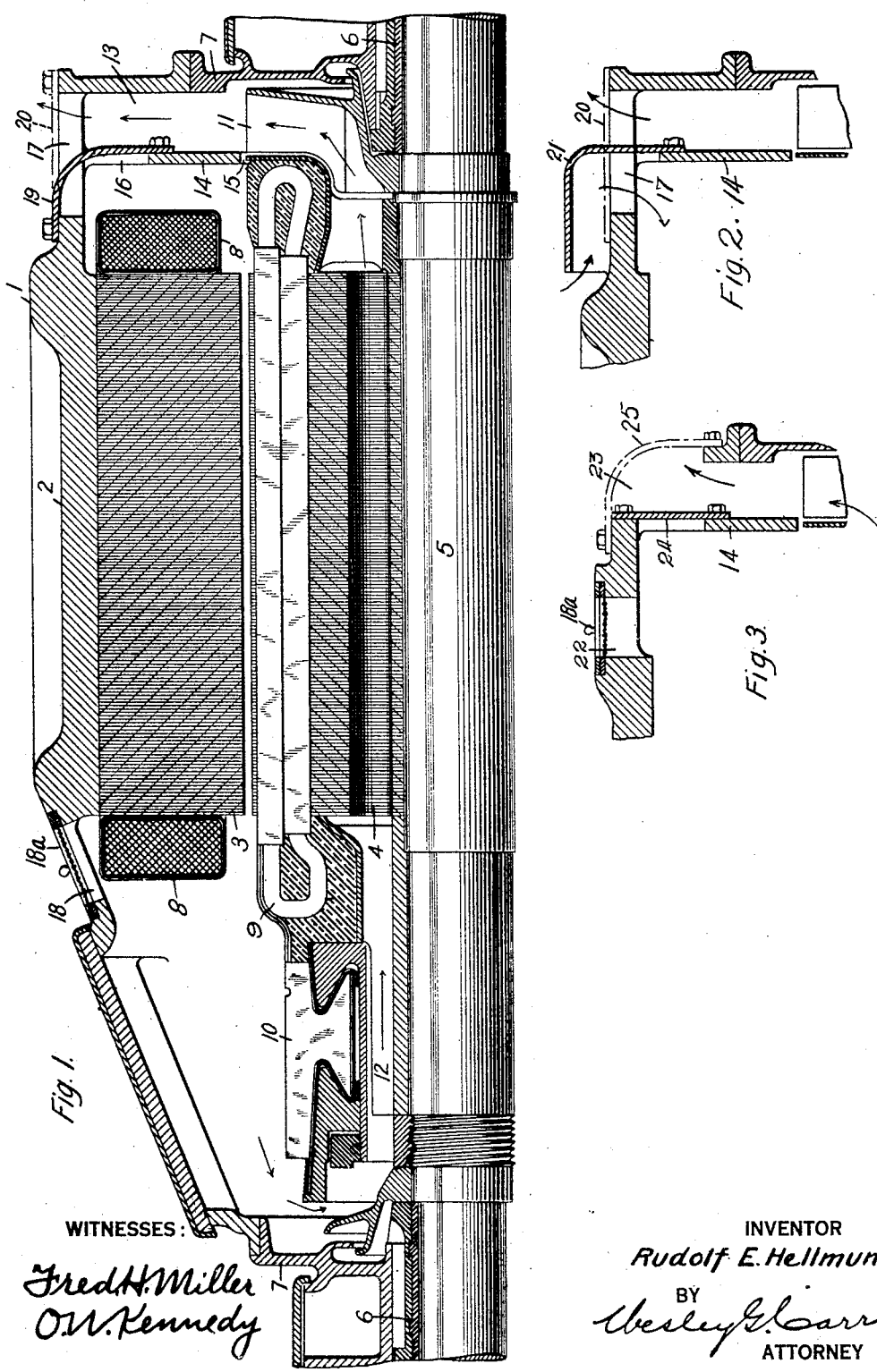
R. E. HELLMUND.
DYNAMO ELECTRIC MACHINE.
APPLICATION FILED JAN. 5, 1916.
1,260,670.
Patented Mar. 26, 1918.
INVENTOR
Rudolf E. Hellmund
BY
ATTORNEY

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

DYNAMO-ELECTRIC MACHINE.

1,260,670.      Specification of Letters Patent.      Patented Mar. 26, 1918.

Application filed January 5, 1916. Serial No. 70,438.

*To all whom it may concern:*

Be it known that I, RUDOLF E. HELLMUND, a subject of the Emperor of Germany, and a resident of Pittsburgh, in the county of Allegheny and State of Pennsylvania, have invented a new and useful Improvement in Dynamo-Electric Machines, of which the following is a specification.

My invention relates to dynamo-electric machines and particularly to the ventilation of heavy-duty motors of the inclosed type.

One of the objects of my invention is to provide a machine of the above indicated type that shall embody simple and efficient means for effectively preventing the overheating of any of its parts under different conditions of operation.

Another object of my invention is to provide an electric motor of the inclosed type in which the circulation of the ventilating medium may be directed either in a closed circuit within the inclosing frame or in an open circuit from the outside atmosphere through the frame.

In previous arrangements for providing a convertible system of ventilation, it has been customary to direct the circulation of the ventilating air by means of a detachable baffle that was adapted to be secured in a number of positions. With such an arrangement, however, it was found necessary to open up the motor in order to make the desired adjustment of the air baffle, which procedure was found to be inconvenient on account of space limitations which ordinarily prevail when motors are operated on electric railway vehicles or in similar locations.

According to my present invention, I provide a means for adapting the motor for either internal or external ventilation in which the detachable parts are readily accessible so that any desired changes may be made while the motors are in operation.

In the accompanying drawings, Figure 1 is a view, partially in section and partially in side elevation, of a motor embodying my invention, and Figs. 2 and 3 are fragmentary sectional views showing modifications of my invention.

The motor comprises an inclosing frame 1 that is provided with projections 2 for suitably supporting field magnet pole pieces 3. A magnetizable armature core 4 is carried on a shaft 5 that is rotatably mounted in bearings 6. The bearings 6 are carried by bearing housings 7 that are supported in end-openings in the frame 1. The pole pieces 3 and the armature core 4 are provided with suitable field magnet and armature windings 8 and 9, respectively. The shaft 5 is further provided, at one end, with a commutator cylinder 10 and, at the other end, with a fan 11. A longitudinal passage 12 extends beneath the commutator cylinder 10 and through the armature core member 4 to the intake opening of the fan 11. The fan 11 is adapted to deliver air radially outwardly upon the rotation of the armature shaft.

The frame 1 is provided, at the fan-end of the motor, with an annular air chamber 13 that is formed by a lateral flange 14 that subdivides the space between the end wall of the frame and the field magnet winding 8. The flange 14 is provided with a central opening 15 that is of somewhat greater diameter than that of the fan 11 and is so positioned that the fan 11 is adapted to discharge into the chamber 13. The flange 14 is further provided with an opening 16 adjacent to the top of the frame 1 and the frame 1 is provided with an opening 17 that communicates with the air chamber and extends beyond the plane of the flange 14. The frame 1 is further provided, at the commutator-end of the motor, with an opening 18 the size of which may be adjusted by means of an adjustable damper 18ª. The adjustable damper 18ª may be of any convenient type but is preferably formed of coacting grid members, as described in a copending application, Serial No. 25,839, filed by Myra S. Davis on behalf of Joseph LeC. Davis (deceased) May 4, 1915, and assigned to the Westinghouse Electric & Manufacturing Company.

The air chamber 13 is provided with a curved air baffle 19 that is detachably secured, at one end, to the flange 14 and, at the other end, to the portion of the frame 1 adjacent the opening 17. With the baffle 19 secured in position as shown and with the damper 18ª open, it is apparent that the rotation of the fan 11 will draw air into the motor through the opening 18 and then through the passage 12 in the armature to the fan. The fan 11 will discharge the air into the chamber 13 and out through the uninclosed portion of the opening 17 to the outside atmosphere. Whenever it is found desirable to provide the motor with internal ventilation, the damper 18ª is closed and the baffle 19 removed. A baffle plate 20, shown in dotted lines, is then secured over the opening 17. The rotation of the fan 11 then causes the air to pass in a closed circuit within the frame 1, including the air chamber 13, the opening 16, the spaces between the field magnet coils 8 and the passage 12. It is obvious that the substitution of either of the baffle plates 19 and 20 for the other and the adjustment of the damper 18ª may be readily accomplished without interfering with the operation of the motor.

In the modification shown in Fig. 2, the construction of the motor is substantially the same as that of the motor described in Fig. 1 with the exception that the opening 18 is omitted. In this modification, a curved plate 21 projects above the top of the motor frame so that the horizontal portion of the baffle will form a hood for the left-hand portion of the opening 17. In this case, the ventilating air enters the motor beneath the overhanging portion of the baffle 19 and, after passing through the motor, as described with reference to Fig. 1, it is discharged through the right hand portion of the opening 17.

In the modification shown in Fig. 3, an opening 22 is located at the fan-end of the motor and is provided with an adjustable damper 18ª. An opening 23 is located at the edge of the frame 1 and terminates at the flange 14. In this modification, a straight baffle 24 is used in adapting the motor 4 for external ventilation, while a curved baffle 25, shown in dotted lines, is used in order to provide for internal ventilation. The adjustment of the damper 18ª and the circulation of the air is substantially the same as described with reference to Fig. 1, and it is equally apparent that all adjustments may be made without removing any parts of the motor.

While I have shown my invention in its preferred form, it is to be understood that such modifications may be made therein as may come within the scope of the appended claims.

I claim as my invention:

1. In a dynamo-electric machine, the combination with relatively rotatable members, means carried by the rotatable member for creating a circulation of air, a frame inclosing said members and provided with a top opening, and a flange subdividing the space within the frame below said opening, of means adjustable with respect to said flange and to said opening for directing the circulation of air either in a closed circuit within the frame or in an open circuit from the outside atmosphere through said opening.

2. In a dynamo-electric machine, the combination with relatively rotatable members, means carried by the rotatable member for creating a circulation of air, a frame inclosing said members and provided with a top opening, and a flange subdividing the space within the frame below said opening, of means coacting with said flange and the edges of said opening for directing the circulation of air either in a closed circuit within the frame or in an open circuit from the outside atmosphere through said opening.

3. In a dynamo-electric machine, the combination with relatively rotatable members, a fan carried by the rotatable member for creating a circulation of air, a frame inclosing said members and provided with a top opening, and a flange subdividing the space within the frame between the fan and said opening, of means adjustable with respect to said flange and to said opening for directing the circulation of air either in a closed circuit within the frame or in an open circuit from the outside atmosphere through said opening.

4. In a dynamo-electric machine, the combination with relatively rotatable members, a fan carried by the rotatable member for creating a circulation of air, a frame inclosing said members and provided with a top opening, and a flange spaced from the frame and subdividing the space between the fan and said opening, of means for directing the circulation of air either in a closed circuit over said flange and within the frame or in an open circuit from the outside atmosphere through said opening.

In testimony whereof, I have hereunto subscribed my name this 30th day of Dec., 1915.

RUDOLF E. HELLMUND.